United States Patent [19]

Kokot et al.

[11] Patent Number: 5,564,195
[45] Date of Patent: Oct. 15, 1996

[54] MEASURING DEVICE FOR CHAIRS

[75] Inventors: Douglas D. Kokot, Grand Rapids; Mary Beth Van De Riet, Holland; Paul F. Allie, Grand Rapids, all of Mich.; Steven F. Trinkel, Rockport, Ind.; James M. Williams, Schwenksville, Pa.; Randy J. Ruster, Zeeland, Mich.; James K. G. Suzuki, Scarborough, Canada

[73] Assignee: The Business and Institutional Furniture Manufacturers Association, Grand Rapids, Mich.

[21] Appl. No.: 333,203

[22] Filed: Nov. 2, 1994

[51] Int. Cl.$^6$ .................................................... G01B 5/20
[52] U.S. Cl. ............................... 33/545; 33/600; 33/1 BB
[58] Field of Search .......................... 33/545, 546, 561.1, 33/600, 1 BB, 511

[56] References Cited

U.S. PATENT DOCUMENTS

| | | | |
|---|---|---|---|
| 2,301,841 | 11/1942 | Zeder | 33/561.1 |
| 5,456,019 | 10/1995 | Dowell et al. | 33/600 |

FOREIGN PATENT DOCUMENTS

| | | | |
|---|---|---|---|
| 238304 | 9/1990 | Japan | 33/561.1 |

OTHER PUBLICATIONS

Exhibit A is a brooklet entitled "ANSI/HFS 100–1988 American National Standard for Human Factors Eng. of Visual Display Terminal Workstation", copright 1988, published by the Human Factors Society, Inc., Santa Monica, California, which discloses on pp. 74–75 a seat test device. Exhibit B is a booklet entitled "Office Furniture Swivelling Office Chairs, Safety Requirements, Testing", dated Jun. 1988, published by Deutsches Institut Fur Normung, Berlin, West Germany, which discloses on pp. 15–16 dummy buttocks.

Exhibit C is a booklet entitled ANSI/BIFMA x5.1–1993 "American National Standard for Office Furnishings—General Purpose Office Chairs—Tests", published by American National Standards Institute, New York, which discloses various chair testing methods.

Exhibit D is a pamphlet entitled "Japanese Industrial Standard, Standard Size of Chairs for Office", copyright 1984, published by Japanese Standards Association, which discloses a chair measuring device and test methods.

*Primary Examiner*—Christopher W. Fulton
*Attorney, Agent, or Firm*—Price, Heneveld, Cooper, DeWitt & Litton

[57] ABSTRACT

A chair measurement device includes a base configured to stably engage a chair seat in a manner simulating a person sitting on the chair, and further includes an upright member pivotally mounted on the base for simulating the person leaning against the chair back. The upright member includes an upper section having an arcuately shaped rear surface, and an elastic member is extended between the upper section and the base for engaging the chair back to facilitate positioning the device on a chair. The upright member is lockable on the base to facilitate initial positioning of the measurement device on the chair, but is releasable and movable against the chair back to facilitate taking measurements. The base and the upright member include planar surfaces for supporting measurement taking tools, and further include slots for locating the tools in square and predetermined positions on the measurement device. A method using the measurement device includes placing the measuring device in a chair with the upright member in a locked position on the base, and adjusting the position of the measuring device on the seat until the upright member contacts the back. The method further includes releasing the upright member and moving the upright member to a rest position against the back. Measurements can then be taken in a manner simulating a person sitting in the chair.

27 Claims, 5 Drawing Sheets

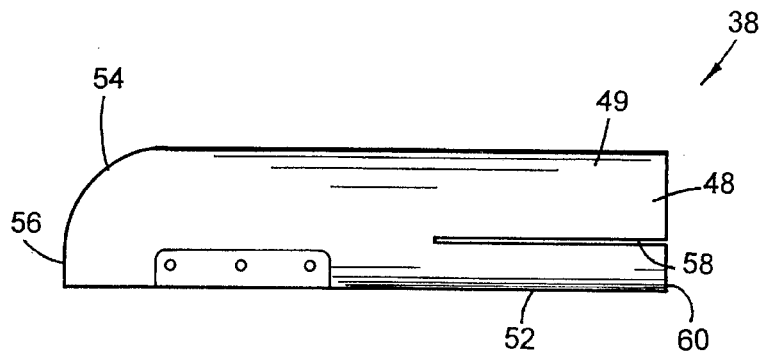 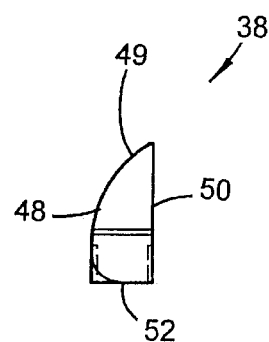
FIG. 6    FIG. 7
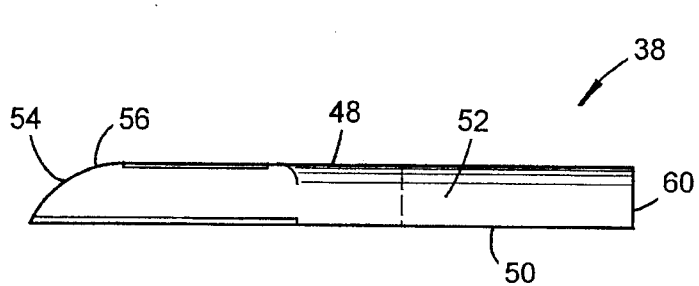 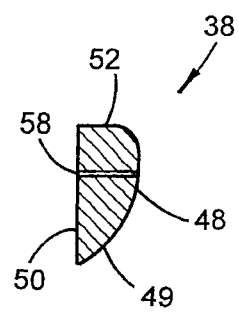
FIG. 8    FIG. 10
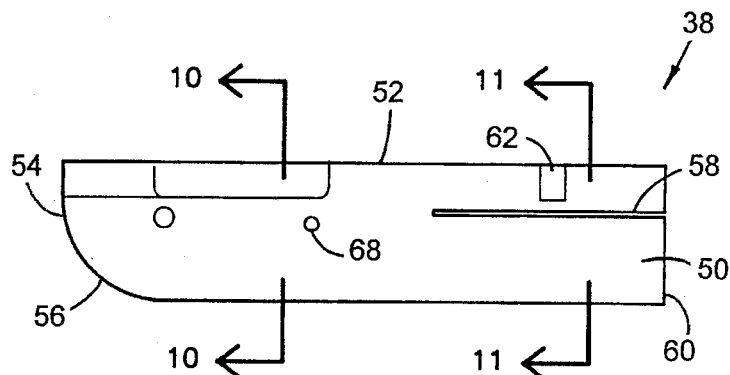 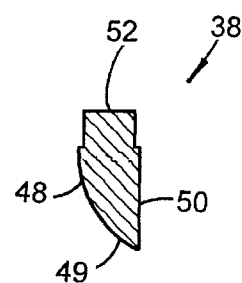
FIG. 9    FIG. 11

MEASURING DEVICE FOR CHAIRS

BACKGROUND OF THE INVENTION

The present invention concerns measuring devices, and in particular concerns a device to facilitate measuring the back and the seat of a chair.

It is desirable to take measurements on a chair in a manner that is closely associated with the way an occupant is supported on the chair so that the data reflects the reality of an occupant being supported on the chair. However, many modern chairs are difficult to measure in this way. For example, many modern chairs include occupant supporting surfaces formed by a combination including fabric and foam supporting the fabric, which fabric and foam are three-dimensionally contoured and have physical properties chosen to provide aesthetics and maximum comfort. The combination of the foam and fabric, and also the contour, provide a complex acting support that makes it difficult to accurately and repeatably measure chairs in a uniform "standard" manner that reflects the way in which a human body is supported. Specifically, aside from the fact that each human body is proportioned differently, it is difficult to engage the chair in a repeatable manner even if an optimal standard is agreed upon. For example, the elasticity of fabrics and the tension of the fabrics in assembled chairs vary between chair models, and vary even within a given chair model. Further, the contour makes the fabric elastically deform in a complex three dimensional manner. Still further, the compressibility and density of the foam vary. Thus, even if the same technician is used to place the measurement device on a chair, it is difficult to position the device exactly in the same position, especially given the contoured surface of the cushioned seat.

In one commonly used test for measuring seats (see pages 74–75 of the booklet submitted herewith entitled ANSI/HFS 100-1988, *American National Standard for Human Factors Engineering of Visual Display Terminal Workstations*), a template including a pair of pivotally connected elongated members is used. One elongated member is placed on the chair seat and the other is placed against the chair back. The template is then adjusted by a given procedure and measurements are taken. However, the template is two dimensional, and thus cannot account for or measure a chair having three-dimensionally contoured occupant supporting surfaces. Further, the template is not self stabilizing, and thus the data taken by use of the template is very sensitive to operator variability. For example, the data is sensitive to the amount of pressure applied by the test technician for holding the template against the seat and back.

Thus, a measuring device anti method solving the aforementioned problems are desired.

SUMMARY OF THE INVENTION

In one aspect, the present invention includes a measurement device for chairs having a back and a seat. The measurement device includes a base configured to stably engage the seat of a chair in a self supporting manner, and an upright member movably connected to the base, the upright member including a back engaging member for engaging the back of the chair. The device further includes means located on at least one of the base and the upright member for measuring the seat and the back to a standard. In a preferred form, an elastic member is extended between a rear surface on the upright member and a rear edge of the base for engaging the chair back to facilitate initial positioning on the chair. Also, the upright member is lockable to facilitate initial positioning of the measurement device on the chair, but is releasable for movement against the chair back to facilitate taking measurements.

In another aspect, the present invention includes a method for measuring a chair including a seat and a back. The method includes providing a measuring device including a base and a lockable back engaging upright member positioned on the base. The method further includes placing the measuring device in the chair with the back engaging upright member in a locked position, adjusting the position of the measuring device on the seat until the measuring unit contacts the back, releasing the back engaging upright member from the base, and moving the back engaging upright member to a rest position against the back.

These and other features, advantages and objects of the present invention will be further understood and appreciated by those skilled in the art by reference to the following specification, claims and appended drawings.

BRIEF DESCRIPTION OF THE DRAWINGS

FIG. 2 is a side view of the chair measurement device shown in FIG. 1, the device being shown in a first position on the chair with the upright member locked to the base and the elastic band touching the back of the chair;

FIG. 3 is a side view of the chair measurement device shown in FIG. 1, the upright member being shown in a rearwardly-tilted back-engaging position;

FIGS. 4–5 are top and bottom views, respectively, of the base shown in FIG. 2;

FIGS. 6–9 are orthogonal views of a leg of the seat engaging base shown in FIG. 4;

FIGS. 10–11 are cross-sectional views taken along the planes X—X and XI—XI, respectively, in FIG. 9;

DETAILED DESCRIPTION OF THE PREFERRED EMBODIMENT

Figure 1:
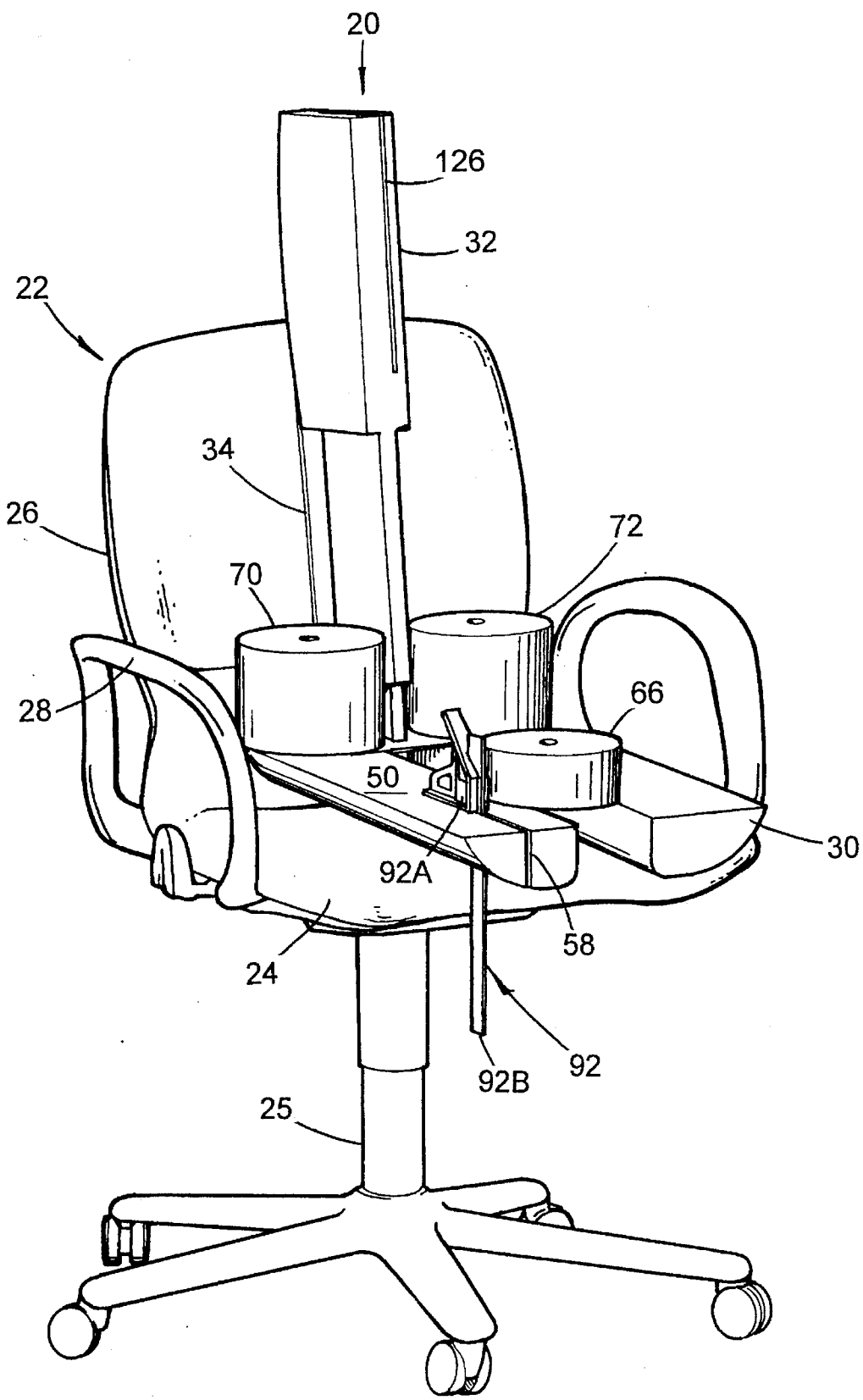
FIG. 1 is a perspective view of a chair measurement device embodying the present invention, the chair measurement device having been positioned on a chair.

For purposes of description herein, the terms "upwardly," "lower," "right, "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A measurement device 20 (FIG. 1) embodying the present invention is adapted to repeatably and reliably measure a chair 22 to a standard based on the characteristics of a human body of a predetermined size. Chair 22 includes a seat 24 supported by a base 25, a reclineable back 26, and armrests 28. Measurement device 20 includes a base 30 configured to stably engage seat 24 in a self-supporting manner and in a manner comparable to a person sitting in the chair 20. An upright member 32 is pivotally connected to base 30, and engages back 26 in a manner comparable to a person leaning backwardly on chair 20. An elastic member 34 extends between upright member 32 and base 30 for engaging and consistently locating device 20 on chair 22. Once device 20 is properly located on chair 22, measurements can be reliably and repeatably taken from base 30 and upright member 32 as set forth below.

Base 30 (FIGS. 4–5) includes right and left thigh simulating members 38 and 40 and a center piece 42 interconnected by top and bottom plates 44 and 46, respectively. Thigh simulating members 38 and 40 are mirror images of each other in shape, and thus only thigh simulating member 38 will be described hereinafter.

Thigh simulating member 38 (FIGS. 6–11) is elongated and includes a lower surface 48 radiused along its outer side 49. Thigh simulating member 38 further includes orthogonally related upper and inner surfaces 50 and 52, respectively. The rear of lower surface 48 is further radiused at location 54 and still further is radiused at its rear outer corner at location 56. An elongated slot 58 extends between upper and lower surfaces 48 and 50 from the front end 60 of thigh simulating member 38 to a position about midway along the length of thigh simulating member 38. Elongated slot 58 is cut into center piece 42 for receiving a tee square (92) to measure chair 22, as discussed below. A notch 62 is located a few inches from the front end 60 in upper surface 50 adjacent inside surface 52. A tee-shaped locator 64 (FIG. 4) is fit into notches 62 on thigh simulating members 38 and 40, and weights 66 (FIG. 1) are located on locator 64. A vertical hole 68 (FIGS. 6–11) is located in upper surface 50 in the rear half of thigh simulating member 38. A pair of pins (not shown) are positioned in holes 68 in thigh simulating members 38 and 40, and weights 70 and 72 (FIG. 1) are located on the pins near the rear of thighs simulating members 38 and 40. Notably, weights 66, 70 and 72 simulate the total weight and weight distribution of a person having a predetermined body size and mass. For example, an optimal standard proposed by the inventors is a 5th percentile woman.

Figures 2, 3, 4, 5:
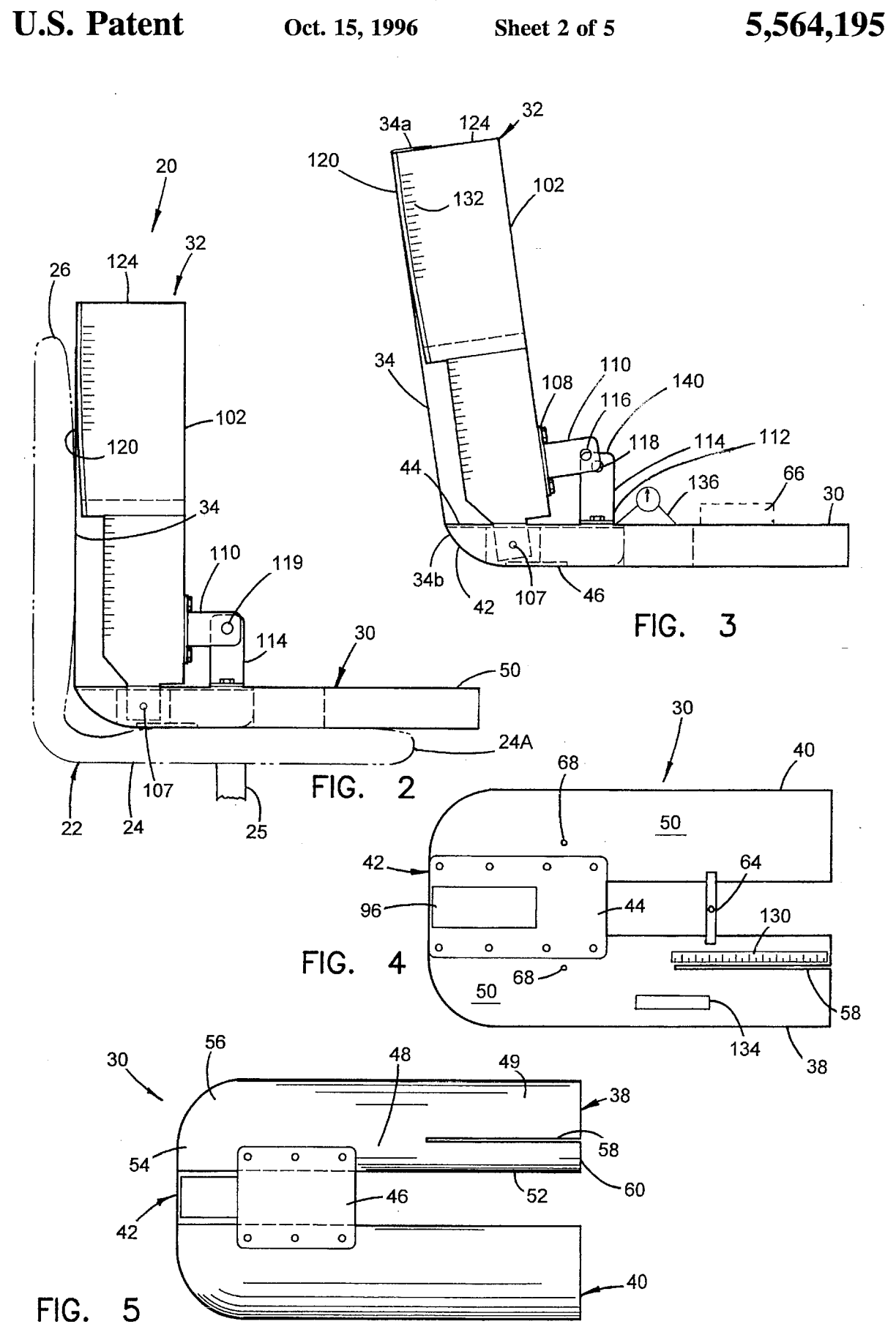
Figure 12:
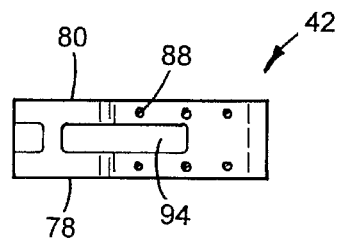
FIGS. 12–14 are orthogonal views of the center piece for connecting the legs of the base as shown in FIG. 4.

Center piece 42 (FIGS. 12–14) is an elongated member having a length somewhat less than half the length of thigh-shaped members 38 and 40. Center piece 42 includes a rectangular cross section having an upper surface 76, side surfaces 78 and 80, and bottom surface 82. The rear bottom surface 82 is radiused comparably to rear surface (54) of thigh-shaped member 38. A depression 84 is formed in bottom surface 82 for receiving the plate 44, and holes 88 are located in center piece 42 for securing the top plate (46) and bottom plate (44) to center piece 42. A slot 94 is located in center piece 42 and a mating slot 96 is located in top plate 42 (FIG. 4). A transverse hole 98 (FIG. 13) extends between side surfaces 78 and 80 near the rear of center piece 42 for receiving a pivot pin (107) to pivotally secure upright member 32 to base 30.

Figure 13:
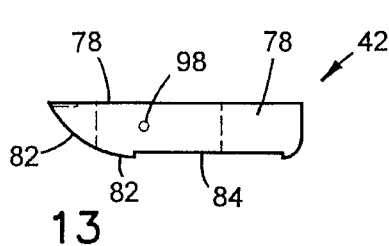
Figure 14:
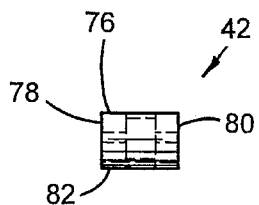
Figure 15:
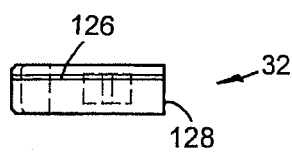
FIGS. 15–17 are orthogonal views of the back engaging upright member shown in FIG. 2.
Figure 16:
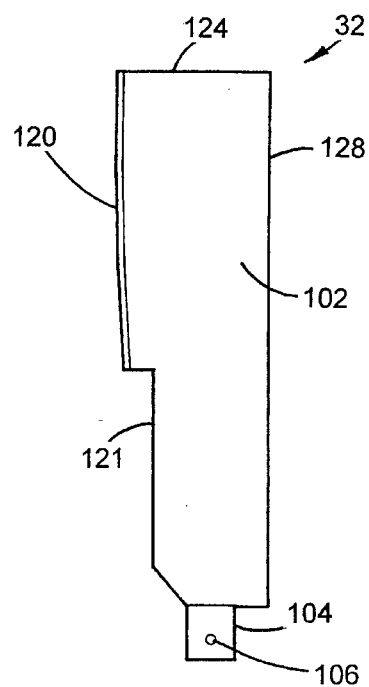
Figure 17:
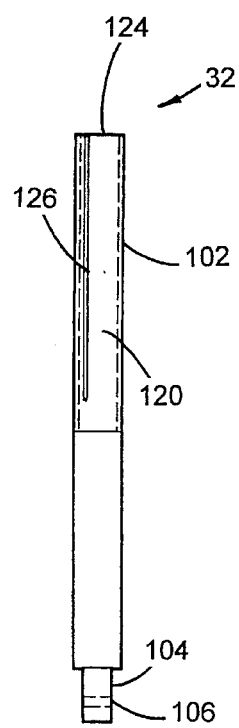

Upright member 32 (FIGS. 15–17) includes an upper section 102 and a pivot forming lower section 104. Lower section 104 is configured to fit mateably into the slot 94 in center piece 42 (FIG. 12) and the slot 96 in top plate 44 (FIG. 4), and includes a transverse hole 106 (FIG. 16) alignable with the transverse hole 98 in center piece 42 (FIG. 13). A pivot pin 107 (FIG. 3) extends through transverse holes 98 and 106 to pivotally secure upright member 32 to base 30. A bracket 108 attaches to lower section 104 and includes a finger 110 that extends forwardly. A second bracket 112 attaches to top plate 44 over center piece 42 and includes a second finger 114 that extends upwardly. Fingers 110 and 114 include holes 116 and 118, respectively, that are alignable. A pin 119 (FIG. 2) is extended through holes 116 and 118 to secure upper member 32 at a predetermined angle to base 30 during initial positioning of measuring device 20 on chair 22.

Upper section 102 (FIGS. 2–3) includes a rear surface 120 for engaging chair back 26 and a cutaway region or recess 121 located below rear surface 120. Optimal results have been obtained by utilizing a rear surface 120 that defines an arc of about 90 to 91 inches so that surface 120 simulates a human's back as upper section 102 is pivoted about pivot pin 119 against chair back 26. Rear surface 120 has a sufficient length so that it will contact chair back 26 as upright member 32 is leaned rearwardly. The elastic member 34 includes an end 34A secured to the top 124 of upper section 102 and is extended along rear surface 120 downwardly to the rear of center piece 42 of base 30, where a second end 34B of elastic band 34 is secured. The elastic band 34 is tensioned so that it extends tangentially from rear surface 120. A vertical slot 126 (FIG. 17) is located in upper section 102. Slot 126 is offset toward a side of upper section 102 and extends between rear surface 120 and a front surface 128 of upper section 102.

Figure 18:
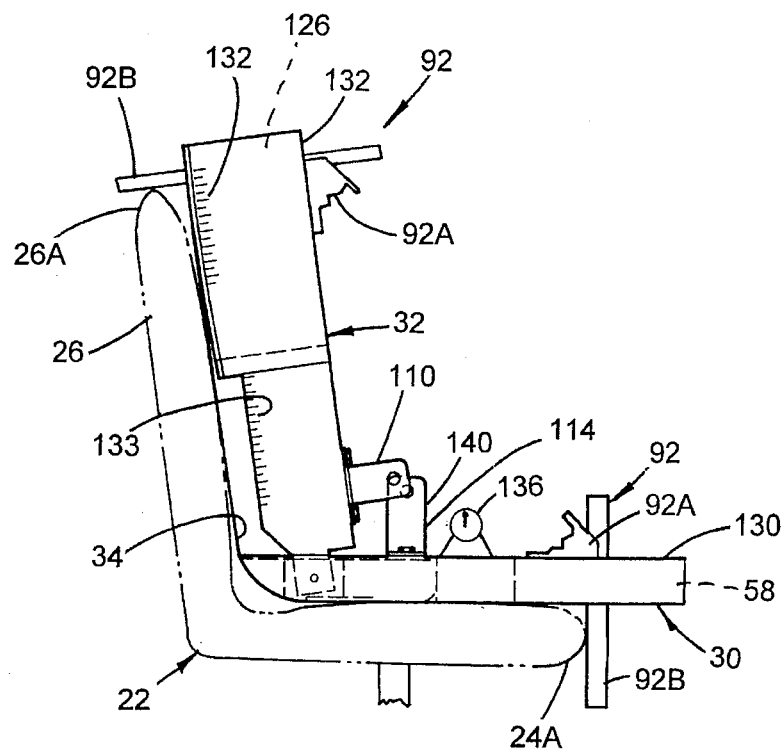
FIG. 18 is a side view showing a method of taking measurements including using a tee square on the chair measurement device.

Elastic band 34 is positioned to one side of slot 126 and a scale 132 is located along rear surface 120 to facilitate taking measurements to indicate where chair back 26 contacts arcuate surface 120 (FIG. 18). Scales 130 and 132 are located along slots 58 and 126 to facilitate measuring chair 22 with a tee square 92 including orthogonal legs 92A and 92B. To use tee square 92, first leg 92A is positioned against planar upper surface 50 of thigh simulating member 38 with second orthogonal leg 92B of tee square 92 extending through slot 58 into engagement with the front edge 24A of chair seat 24. Scale 130 is then viewed to determine the position of tee square leg 92B and chair seat edge 24A. Similar measurements can be taken by positioning tee square 92 in slot 126 in upper section 102 of upright member 32 for measuring the height of chair back 26. Also, a ferrous planar plate 134 (FIG. 4) is located on upper surface 50 of thigh simulating member 28 to receive a magnetically held inclination indicator 136 (FIG. 18). A similar plate can be included on the front surface of upper section 102, or alternatively, a scale 140 could be marked on finger 110 to indicate the movement of upright member 32 relative to base 30 as finger 110 moves away from finger 114 (as upright member 32 is leaned rearwardly after removing pin 120).

Having described chair measuring device 20 and the interrelationship of parts thereof, the operation and advantages of chair measuring device 20 will become apparent to a person of ordinary skill in the art. Measuring device 20 is initially placed in chair 22 with weights 66, 70 and 72 applied (FIG. 1). Chair 22 is then checked to insure that chair 22 is in the full up position and that the angle of seat 24 is adjusted as near to 0° or horizontal as possible. If the angle of back 26 is adjustable, back 26 is adjusted to the full upright position, but not less than 90' nor greater than 100' from horizontal. If back 26 is adjustable, the position of the lumbar of back 26 is adjusted to be within an acceptable range. If after these adjustments, the angle of seat 26 has changed, weights 66, 70 and 72 are removed from measuring device 20 (FIG. 2). With measuring device 20 positioned on the center line of seat 24, measuring device 20 is pushed rearwardly onto chair 22 until either base 30 contacts seat back 26 or until the lumbar support 27 of chair back 26 strikes elastic member 34 or surface 120. Pin 120 is then removed, and upright member 32 is allowed to pivot rearwardly against back 26 until it comes to rest against back 26 (FIG. 3). Weights 66, 70 and 72 are again placed on base 30 (FIG. 1).

The lumbar of chair 22 is measured by placing the back 26 of chair 22 in the fully upright position, and recording the center of the lumbar at the location where it is engaged by elastic member 34 (FIG. 18). Back 26 is then fully lowered, and the center of the lumbar region for chair back 26 is again recorded. The back rest height is measured by using the combination "tee" square 92. Combination square 92 is extended through slot 126 and, while holding it against the front of upright member 32 to keep it square, combination square 92 is moved downwardly until it just contacts the top of back 26. If the top of back rest 26 is adjustable, the measurement is taken in the up position. The seat depth is measured by positioning combination square 92 in slot 58 of thigh simulating member 38. While maintaining combination square 92 perpendicular to the upper surface 50 of thigh simulating member 38, combination square 92 is moved rearwardly until it comes into contact with the front edge of seat 24. The angle of seat 24 and the angle of back 26 are measured by positioning a magnetically held inclination indicator 136 on surface 50 of thigh simulating member 38 and the front surface 121 of upright member 34, respectively.

Figure 19:
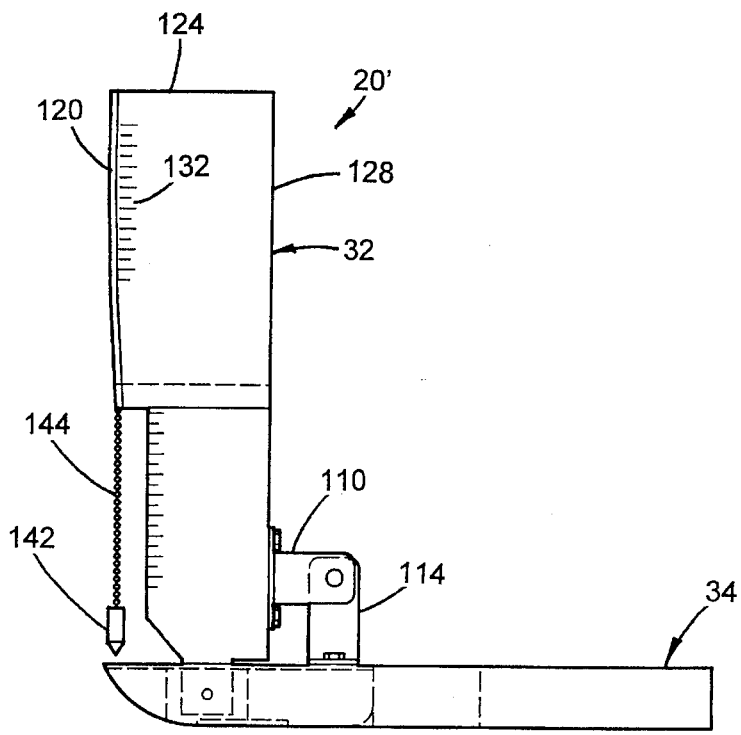
FIG. 19 is a side view of a modified chair measurement device embodying the present device.

A modification is contemplated wherein elastic member 122 is replaced with a plumb bob 142 (FIG. 19). Plumb bob 142 is used to indicate the appropriate location of measuring device 20' as measuring device 20' is moved rearwardly on seat 24 until plumb bob 136 engages back 26. Notably, plumb bob 142 is shown as being attached to the lower rear corner of upper section 102 of upright member 32 by a flexible chain 144, although it is contemplated that chain 144 could be replaced with a flat, flexible band that extends across surface 120 and is secured to the top of upper section 102 much like elastic band 34. It is also contemplated that elastic member 122 could be replaced with a force measuring device (not shown) which would measure the force against chair back 26 as measuring device 20 was adjusted rearwardly.

Thus, a chair measuring device is provided which measures chairs against a standard in a repeatable and reliable manner and in a manner related to the way in which a person is supported on the chair. In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A measurement device for chairs having a back and a seat, comprising:

a base configured to stably engage an upper surface on the seat of a chair in a self supporting manner;

an upright member movably connected to said base, said upright member including a back engaging member for engaging the back of the chair; and at least one of said base and said upright member including a planar surface having measurement indicia thereon, the planar surface being shaped to engage and cooperate with a "Tee square" simulating measuring tool to permit accurate measurement of the associated one of the seat and the back to a standard related to the indicia.

2. A measurement device as defined in claim 1 wherein said upright member is pivotally connected to said base.

3. A measurement device as defined in claim 2 including means for locking said upright member in a predetermined position on said base, said means for locking being releasible so that, once said device is positioned on the chair, said upright member can be moved against the back.

4. A measurement device as defined in claim 1 wherein said back engaging member includes a curvilinear surface.

5. A measurement device as defined in claim 1 wherein said back engaging member is spaced from said base and defines a gap with said base.

6. A measurement device as defined in claim 1 wherein said base includes a planar surface for supporting a measurement taking tool.

7. A measurement device as defined in claim 1 wherein said base includes a pair of members projecting in a manner simulating the chair-engaging underside of a pair of legs of an occupant.

8. A measurement device as defined in claim 7 wherein said pair of members are spaced apart, and said base further including a center piece interconnecting said pair of members and pivotally supporting said upright member.

9. A measurement device as defined in claim 1 including weights located on and distributed about said base.

10. A measurement device as defined in claim 1 wherein one of said base and said upright member includes a magnetically responsive metal strip for receiving a magnetically attached tool for measuring said chair.

11. A measurement device as defined in claim 1 wherein said upright member includes a planar surface for supporting a measurement taking tool.

12. A measurement device as defined in claim 1 wherein said upright member includes means for measuring the location of lumbar support provided by said chair back when said chair back is supporting a person.

13. A measurement device as defined in claim 12 wherein said back engaging member is spaced from said base and defines a gap therebetween, and including an elongated flexible member extending between said back engaging member and said base, said flexible member and said back engaging member forming part of said means for measuring the location of lumbar support.

14. A measurement device as defined in claim 1 including means for measuring the angle of said upright member to said base.

15. A measurement device as defined in claim 1 wherein one of said base and said upright member include means for measuring the relative location of the front edge of the seat and the upper edge of the back relative to a standard based on a person sitting in the chair.

16. A measurement device for chairs having a back and a seat, comprising:

a base configured to stably engage the seat of a chair in a self supporting manner; an upright member movably connected to said base, said upright member including a back engaging member for engaging the back of the chair;

means located on at least one of said base and said upright member for measuring the seat and the back to a standard; and said back engaging member including a curvilinear surface defining an arc having a radius of about 90 to 91 inches.

17. A measurement device for chairs having a back and a seat, comprising:
   a base configured to stably engage the seat of a chair in a self supporting manner;
   an upright member movably connected to said base, said upright member including a back engaging member for engaging the back of the chair, said back engaging member being spaced from said base and defining a gap with said base;
   means located on at least one of said base and said upright member for measuring the seat and the back to a standard; and
   an elastic member extended between said back engaging member and said base, said elastic member spanning said gap and being configured to engage said back in a lumbar area of said back.

18. A measurement device for chairs having a back and a seat, comprising:
   a base configured to stably engage the seat of a chair in a self supporting manner;
   an upright member movably connected to said base, said upright member including a back engaging member for engaging the back of the chair;
   means located on at least one of said base and said upright member for measuring the seat and the back to a standard; and
   said base including a slot located over the front of the chair seat and further including indicia positioned along said slot, said slot being configured to receive a "Tee square" simulating measurement taking tool for engaging the front of the chair seat so that the measurement taking tool indicates a measurement position of the front of the chair seat on the indicia.

19. A measurement device for chairs having a back and a seat, comprising:
   a base configured to stably engage the seat of a chair in a self supporting manner;
   an upright member movably connected to said base, said upright member including a back engaging member for engaging the back of the chair;
   means located on at least one of said base and said upright member for measuring the seat and the back to a standard; and
   said upright member including a slot located generally vertically and overhanging the upper edge of the chair back, and further including indicia positioned along said slot, said slot being configured to receive a "Tee square" simulating measurement taking tool for engaging the upper edge of the chair back so that the measurement taking tool indicates a measurement position of the upper edge of the chair back on the indicia.

20. A measurement device for chairs having a back and a seat, the seat and the back including occupant supporting surfaces, comprising:
   a base configured to stably engage the occupant supporting surface of the seat of a chair;
   an upright member movably connected to said base, one of said upright member and said base including means for positioning said base on the seat, said upright member including means for engaging the chair back in a manner simulating a person's back once said base is adjusted on the seat;
   a measurement tool engageable with one of said base and said upright member for measuring the chair to a standard;
   said means for positioning said base on the seat including an elongated member extending from said upright member toward said base, said elongated member being positioned to engage the back; and
   said upright member including a curvilinear surface facing the chair back, and said elongated member including an elastic strip extended between said base and said upright member at least partially over said curvilinear surface.

21. A measurement device for chairs having a back and a seat, comprising:
   a base configured to engage the seat of a chair, said base including a rear edge;
   an upright member pivotally mounted to the base, said upright member including a rear surface; and
   an elastic member extended between said rear edge of said base and said rear surface of said upright member, said elastic member including an unsupported section spanning between said rear edge and said rear surface for engaging the chair back.

22. A measurement device as defined in claim 21 wherein said rear surface of said upright member has a curvilinear shape.

23. A measurement device as defined in claim 22 wherein said rear surface includes an arcuate section.

24. A measurement device as defined in claim 23 wherein said arcuate section defines a radius of about 90 to 91 inches.

25. A method for measuring a chair including a seat and a back, comprising:
   providing a measuring device including a base and a lockable back engaging upright member positioned on said base;
   placing said measuring device in the chair with said back engaging upright member in a locked position;
   adjusting the position of said measuring device on the seat until said measuring unit contacts the back;
   releasing said back engaging upright member and moving said back engaging upright member to a rest position against the back;
   taking measurements from said measuring device; and
   providing a slot in said base, and positioning a "Tee square" simulating measurement taking tool in said slot to measure the front edge of said seat.

26. A method for measuring a chair including a seat and a back, comprising:
   providing a measuring device including a base and an upright member movably connected to said base, one of said base and said upright member including a chair-back engaging member for locating said measuring device on said chair;
   placing said measuring device in the chair;
   adjusting the position of said measuring device on the seat until said chair-back engaging member contacts the back; and
   measuring the chair by positioning a "Tee square" simulating measuring tool against a planar surface on said measuring device to take measurements therefrom.

27. A method as defined in claim 26 including moving said upright member toward the chair back after adjusting the position of said measuring device.

* * * * *